(12) United States Patent
Kobayashi

(10) Patent No.: US 11,647,140 B2
(45) Date of Patent: May 9, 2023

(54) IMAGE FORMING APPARATUS THAT CONVERTS AN ALTERNATING CURRENT VOLTAGE INTO A DIRECT CURRENT VOLTAGE

(71) Applicant: CANON KABUSHIKI KAISHA, Tokyo (JP)

(72) Inventor: Junya Kobayashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 17/039,635

(22) Filed: Sep. 30, 2020

(65) Prior Publication Data
US 2021/0112172 A1 Apr. 15, 2021

(30) Foreign Application Priority Data
Oct. 9, 2019 (JP) .............................. JP2019-185607

(51) Int. Cl.
*H04N 1/00* (2006.01)
*H02M 3/335* (2006.01)
(52) U.S. Cl.
CPC .... *H04N 1/00891* (2013.01); *H02M 3/33523* (2013.01); *H04N 1/00037* (2013.01); *H04N 1/00899* (2013.01)
(58) Field of Classification Search
None
See application file for complete search history.

(56) References Cited

U.S. PATENT DOCUMENTS

| 2016/0070223 | A1* | 3/2016 | Yamakawa | ........ G03G 15/6538 |
| | | | | 399/82 |
| 2017/0187275 | A1* | 6/2017 | Lin | .......................... H02M 1/36 |
| 2018/0159018 | A1* | 6/2018 | Asano | ............... H02M 3/33523 |
| 2019/0058387 | A1* | 2/2019 | Shimura | ................. H02M 1/08 |

FOREIGN PATENT DOCUMENTS

JP 2015-174374 A 10/2015

* cited by examiner

*Primary Examiner* — Miya J Williams
*Assistant Examiner* — Pawan Dhingra
(74) *Attorney, Agent, or Firm* — Canon U.S.A., Inc. IP Division

(57) ABSTRACT

An image forming apparatus to which an external apparatus is connected includes an image forming unit configured to form an image, and a power supply device configured to supply power to the image forming apparatus and the external apparatus. In a case where a value of an alternating current voltage input to the power supply device is a first value, the power supply device supplies first power to the external apparatus. In a case where the value of the alternating current voltage is a second value smaller than the first value, the power supply device supplies second power smaller than the first power to the external apparatus.

7 Claims, 11 Drawing Sheets

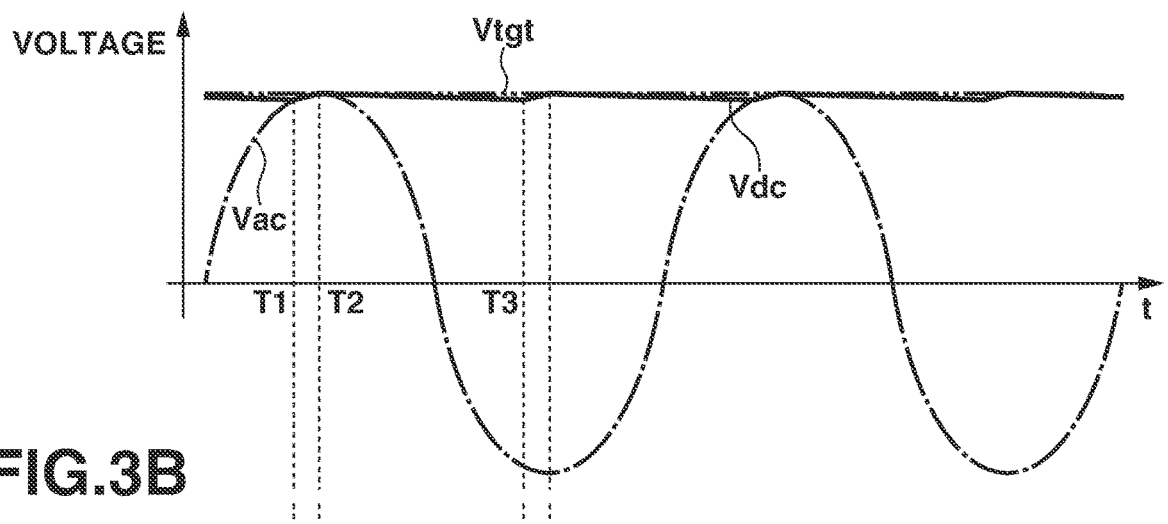
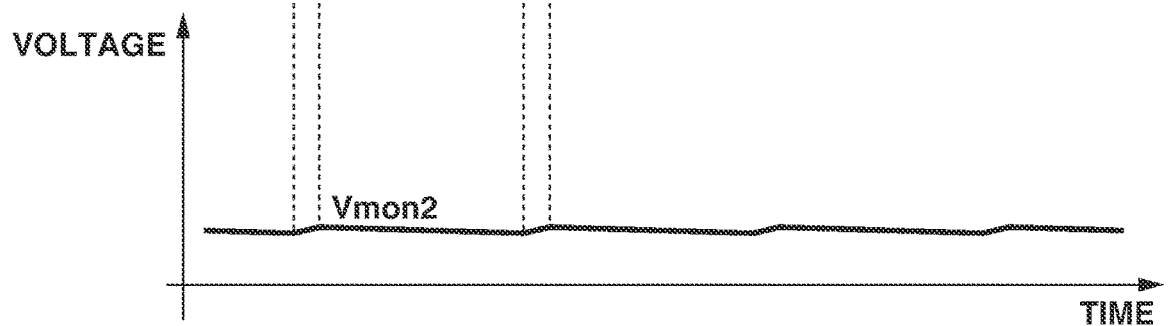

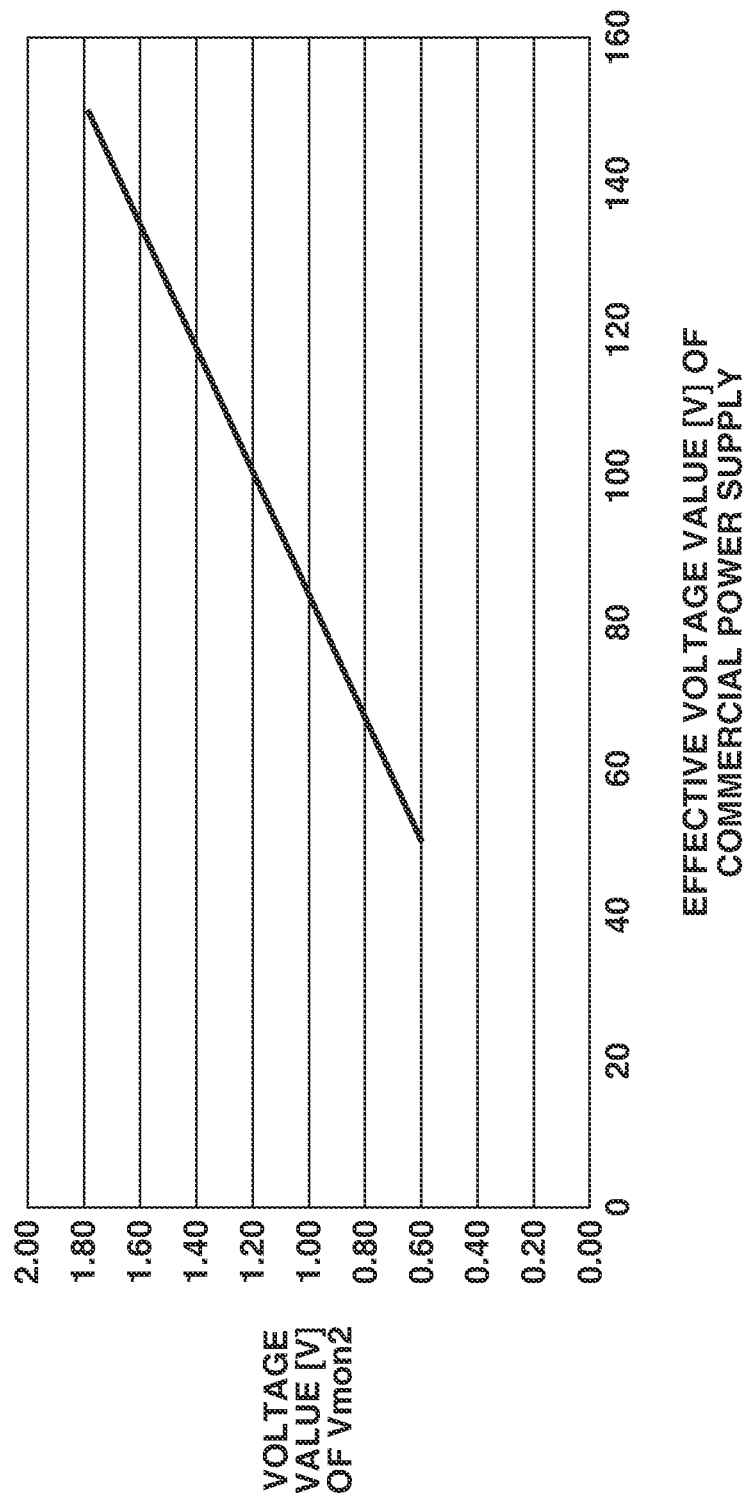

IMAGE FORMING APPARATUS THAT CONVERTS AN ALTERNATING CURRENT VOLTAGE INTO A DIRECT CURRENT VOLTAGE

BACKGROUND

Field

The present disclosure relates to an image forming apparatus including a power supply device that converts an alternating current voltage input from a commercial alternating-current power supply into a direct current voltage and supplies the converted direct current voltage to an apparatus.

Description of the Related Art

As a power supply device, a switching power supply device that generates a direct current voltage by driving an electromagnetic transformer is known. Power that can be supplied by the switching power supply device is, in general, determined by specifications of a circuit component included in the switching power supply, such as a direct current superimposed current of an electromagnetic transformer, and an amount of heat generation by a switching element.

For example, to an image forming apparatus such as a printer or a copying machine having a switching power supply device, a post-processing device can be connected as an external device for use. A case is also assumed where, if power is supplied to an external apparatus during image formation, a maximum power that can be supplied by the switching power supply device is exceeded. Thus, a configuration is discussed in which the supply of power to an external apparatus is limited (Japanese Patent Application Laid-Open No. 2015-174374).

An amount of power that can be supplied by the switching power supply device differs depending not only on specifications of a circuit component, but also on the value of an alternating current voltage input from a commercial alternating-current power supply. In general, the higher the voltage value of the voltage from the commercial alternating-current power supply is, the greater the amount of power that can be supplied is. In Japanese Patent Application Laid-Open No. 2015-174374, a maximum amount of power that can be supplied by a switching power supply device is set to a fixed value taking into account specifications of a circuit component; however, a voltage fluctuation occurring in a commercial alternating-current power supply is not taken into account. That is, in this configuration, power to be supplied to the external apparatus is limited, even in a case where a voltage value of the voltage supplied from the commercial alternating-current power supply is high, and a maximum amount of power that can be supplied is sufficiently great.

To always enable the feeding of power to the external apparatus during a period including an image formation period, the maximum amount of power that can be supplied by the power supply device may be made great. This configuration, however, increases a rated current of a circuit component included in the power supply device, and thereby increasing a cost of the circuit component. Thus, a cost of the power supply device increases.

SUMMARY

According to various embodiments of the present disclosure, an image forming apparatus to which an external apparatus is connected includes an image forming unit configured to form an image, and a power supply device configured to supply power to the image forming apparatus and the external apparatus. The power supply device includes a voltage detection unit configured to detect voltage information regarding an alternating current voltage input to the power supply device. The image forming apparatus includes a power switching unit configured to, in a case where a voltage indicated by the voltage information detected by the voltage detection unit is higher than a threshold, supply power from the power supply device to the external apparatus, and in a case where the voltage indicated by the voltage information detected by the voltage detection unit is lower than the threshold, stop the supply of power from the power supply device to the external apparatus.

According to another embodiment of the present disclosure, an image forming apparatus to which an external apparatus is connected includes an image forming unit configured to form an image, and a power supply device configured to supply power to the image forming apparatus and the external apparatus. In a case where a value of an alternating current voltage input to the power supply device is a first value, the power supply device supplies power to the external apparatus. In a case where the value of the alternating current voltage is a second value smaller than the first value, the power supply device stops the supply of power to the external apparatus.

According to yet another embodiment of the present disclosure, an image forming apparatus to which an external apparatus is connected includes an image forming unit configured to form an image, and a power supply device configured to supply power to the image forming apparatus and the external apparatus. In a case where a value of an alternating current voltage input to the power supply device is a first value, the power supply device supplies first power to the external apparatus. In a case where the value of the alternating current voltage is a second value smaller than the first value, the power supply device supplies second power smaller than the first power to the external apparatus.

Further features will become apparent from the following description of exemplary embodiments with reference to the attached drawings.

BRIEF DESCRIPTION OF THE DRAWINGS

FIGS. 3A and 3B are diagrams illustrating waveforms regarding detection of a voltage of a commercial alternating-current power supply.

FIG. 4 is a graph diagram illustrating a relationship between an effective voltage value of the commercial alternating-current power supply and a voltage value of a capacitor connected to an auxiliary coil on a secondary side of a transformer.

DESCRIPTION OF THE EMBODIMENTS

An image forming apparatus according to various embodiments of the present disclosure includes a switching power supply device, detects a voltage value of an alternating current voltage input from a commercial alternating-current power supply, and according to the detected voltage value, controls the operation of a stapler that is an external apparatus connected to the image forming apparatus. The configuration and control of the image forming apparatus will be specifically described below.

Figure 1:
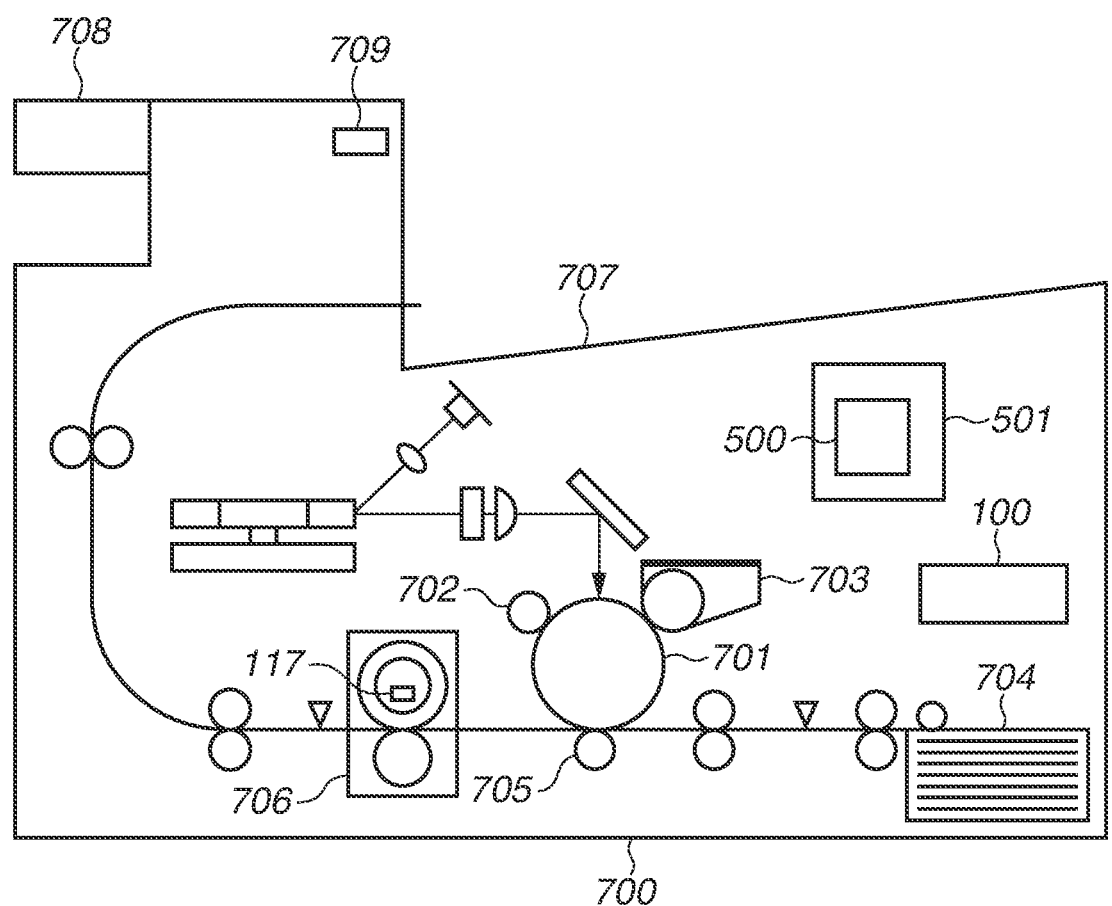
FIG. 1 is a diagram of an image forming apparatus.

FIG. 1 illustrates a general configuration of a laser beam printer 700 as an example of an image forming apparatus according to a first exemplary embodiment. The laser beam printer 700 (hereinafter referred to as "printer 700") includes a photosensitive drum 701 as an image bearing member on which an electrostatic latent image is formed, and a charging unit 702 configured to uniformly charge the photosensitive drum 701. The printer 700 also includes a developing unit 703 configured to develop the electrostatic latent image formed on the photosensitive drum 701 with toner. The printer 700 causes a transfer unit 705 to transfer the toner image developed on the photosensitive drum 701 onto a sheet as a recording material supplied from a cassette 704, causes a fixing device 706 heated by a heater 117 to fix the toner image transferred onto the sheet, and discharges the sheet to a sheet discharge tray 707. The printer 700 also includes a power supply device 100 and supplies power from the power supply device 100 to a driving unit, such as a motor, and a control unit 501. The control unit 501 includes a central processing unit (CPU) 500 and controls an image forming operation performed by an image forming unit, a sheet conveying operation, and a temperature of the heater 117. The printer 700 also includes, as optional devices, a stapler unit 708 for a user to staple a print product on a spot where the user is, and a Universal Serial Bus (USB) port 709 to which a USB device can be connected. Control of an external apparatus connected to the USB port 709 will be described in a second exemplary embodiment.

Figure 2A:
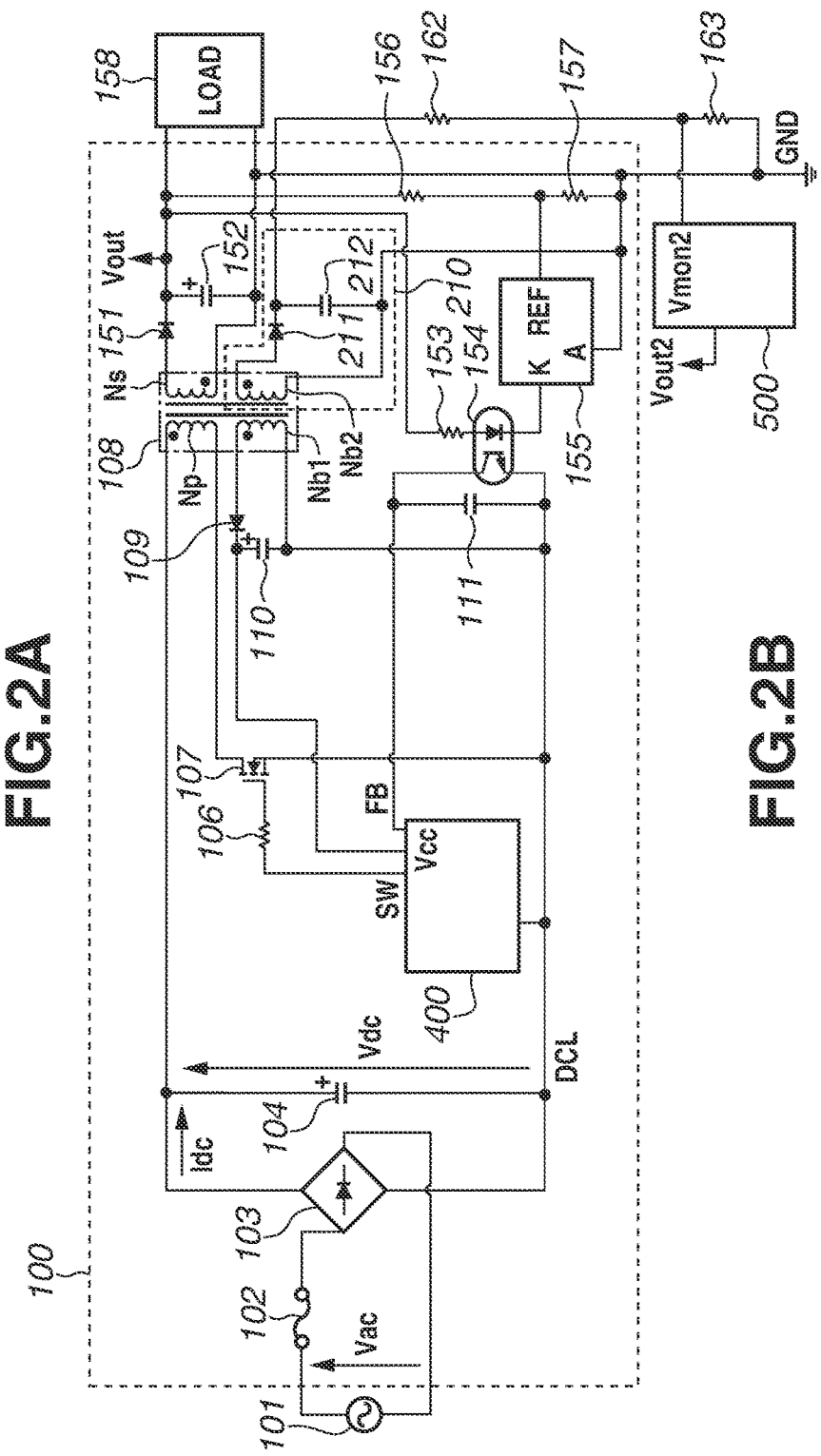
FIGS. 2A and 2B are circuit diagrams illustrating a power supply device according to a first exemplary embodiment.
Figure 2B:
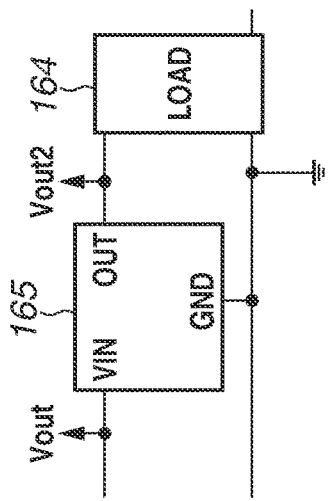

FIGS. 2A and 2B are circuit diagrams illustrating the power supply device 100 according to the first exemplary embodiment. A description is given of a configuration in which output voltages Vout and Vout2 are controlled in the power supply device 100. A power supply control integrated circuit (IC) 400 is an IC for switching power supply control using a flyback method in which a frequency is fixed and the on width is controlled. The basic functions of terminals are as follows.

To a Vcc terminal, a power supply voltage of the power supply control IC 400, which is the voltage between both ends of the Vcc terminal (hereinafter, the voltage between both ends of a capacitor 110 will be referred to as "Vcc"), is input. The voltage Vcc is used as the voltages of the control unit 501 and a driving unit for a switching field-effect transistor (FET) 107. From an SW terminal, a gate driving signal for turning on or off the switching FET 107 is output. To an FB terminal, a signal for controlling the output voltage Vout is input.

The voltage (hereinafter referred to as "Vac") of a commercial alternating-current power supply 101 is rectified by a bridge diode 103 and smoothed by a smoothing capacitor 104, thereby resulting in an approximately direct current voltage. Hereinafter, the voltage between both ends of the smoothing capacitor 104 will be referred to as "Vdc". A fuse 102 is a protection fuse used when an abnormality occurs. If the Vcc terminal is charged with the voltage Vdc, and the voltage Vcc reaches a predetermined voltage value (15 V in this case), the operation of the power supply control IC 400 starts. If the power supply control IC 400 starts, the SW terminal outputs a high level signal (10 V in this case) and shifts the switching FET 107 to a conducting state (an on threshold is 5 V) via a resistor 106. If the switching FET 107 shifts to the conducting state, the voltage Vdc is applied to a primary coil Np. A current flowing through the primary coil Np is accumulated as energy in a transformer 108. To an auxiliary coil Nb1 on the primary side, a voltage is induced such that the anode side of a diode 109 is positive. The capacitor 110 is then charged via the diode 109, and power for the continuous operation of the power supply control IC 400 is supplied to the Vcc terminal.

The output from the SW terminal of the power supply control IC 400 changes to a low level signal (0.3 V in this case) and becomes smaller than an off threshold of the switching FET 107 (the off threshold is 3 V), and the switching FET 107 shifts from the conducting state to a non-conducting state. If the switching FET 107 shifts to the non-conducting state, a voltage having a polarity opposite to a polarity induced when the switching FET 107 is in the conducting state is induced to coils of the transformer 108, and a diode 151 shifts to a conducting state. Energy accumulated in a secondary coil Ns of the transformer 108 is then rectified and smoothed via the diode 151 and a smoothing capacitor 152, thereby resulting in the direct current (DC) output voltage Vout. The DC output voltage Vout is supplied to a load 158. In the printer 700, examples of the load 158 include motors for rotating rollers of the photosensitive drum 701 and the fixing device 706, a motor for conveying a recording material, and a motor for the stapler unit 708.

Voltage control of the output voltage Vout is performed as described below. In the control, an internal reference voltage of a shunt regulator 155 is Vref, a resistance value of a resistor 156 is R1, and a resistance value of a resistor 157 is R2. A voltage obtained by dividing the output voltage Vout by the resistance values R1 and R2 is input to an REF terminal of the shunt regulator 155. In the shunt regulator 155, a feedback signal according to the voltage of the REF terminal is created and fed back as a voltage to the FB terminal of the power supply control IC 400 via a photocoupler 154. A resistor 153 limits a current flowing through the photocoupler 154. A capacitor 111 charges the voltage of the FB terminal. Based on the voltage of the FB terminal, the power supply control IC 400 performs switching control of the switching FET 107 and performs constant voltage control of the output voltage Vout so that the output voltage Vout is a voltage obtained by the following formula (1):

$$V_{out} = V_{ref} \times \frac{R1 + R2}{R2}. \tag{1}$$

In the formula (1), for example, if Vref=2.4 V, R1=18 kΩ, and R2=2 kΩ, Vout=24 V. FIG. 2B is a circuit diagram illustrating a direct-current-to-direct-current (DC-DC) converter configured to generate the output voltage Vout2 from the output voltage Vout. A DC-DC converter 165 performs constant voltage control of the output voltage Vout, thereby obtaining the output voltage Vout2. The output voltage Vout2 is then supplied to a load 164. Examples of the load 164 include the CPU 500, and a USB device connected to the USB port 709. In the present exemplary embodiment, Vout is set to 24 V, and Vout2 is set to 5.1 V.

A description is given of a configuration in which the voltage value (particularly, the effective voltage value in a case where the voltage Vac is a sine wave) of the alternating current voltage of the commercial alternating-current power supply 101 is detected. In FIG. 2A, a voltage detection unit 210 and the CPU 500 detect the voltage Vac. When the switching FET 107 is in a conducting state, the voltage Vdc is applied to the primary coil Np of the transformer 108. Thus, a voltage is induced to an auxiliary coil Nb2 on the secondary side such that the anode of a diode 211 is positive. At this time, a capacitor 212 is charged via the diode 211, and the voltage is smoothed. The voltage (hereinafter, "Vmon2") of the capacitor 212 is connected to a Vmon2 terminal (an analog-to-digital (AD) port) of the CPU 500. Thus, the CPU 500 can detect the voltage value of the voltage Vmon2 by performing AD conversion on the voltage Vmon2. The voltage Vmon2 is a voltage proportional to the turns ratio (Nb2/Np) of the voltage Vdc. Thus, the CPU 500 can estimate the voltage Vdc. The waveform of the voltage Vmon2 is adjusted to be similar to the waveform of the voltage Vdc by adjusting the capacitor 212.

FIGS. 3A and 3B illustrate current and voltage waveforms regarding the detection of the voltage Vac. In each of FIGS. 3A and 3B, a horizontal axis represents time, and a vertical axis represents voltage values. In FIG. 3A, a one-dot chain line represents a waveform of the voltage Vac. A solid line represents a waveform of the voltage Vdc when a load current is 0 A. A two-dot chain line represents a voltage Vtgt (the voltage Vdc in a case where there is no voltage drop). The voltages Vdc and Vac become equal to each other at a timing T1. At the timing T1, a charging current starts to flow through the smoothing capacitor 104. The voltages Vdc and Vtgt become equal to each other at a timing T2. At the timing T2, the charging current stops flowing through the smoothing capacitor 104. The voltage Vdc drops again until a timing T3.

In FIG. 3B, a solid line represents the voltage Vmon2. The auxiliary coil Nb2 is turned in a same direction as the primary coil Np, and thereby the voltage waveform of the voltage Vmon2 is similar to the voltage waveform of the voltage Vdc. While the voltage Vtgt is a direct current voltage, the voltage Vdc drops. The following description, however, is given on the assumption that the drop amount of the voltage Vdc is so small as to be ignored, and Vtgt=Vdc. If the voltage Vac is a sine wave without distortion, the relationship in the following formula (2) holds between the voltage value Vdc [V] of the voltage Vdc and the effective voltage value (Vac_rms [V]) of the voltage Vac. For simplicity of calculation, a forward voltage Vf of the bridge diode 103 is ignored.

$$V_{ac\_rms} = \frac{V_{dc}}{\sqrt{2}}. \quad (2)$$

In the formula (2), the effective voltage value Vac_rms can be calculated if the detection of the voltage Vdc is successful. A relationship in the following formula (3) approximately holds between the voltages Vdc and Vmon2:

$$V_{mon\,2} = V_{dc} \times \frac{Nb2}{Np} \times \frac{R163}{R162 + R163}, \quad (3)$$

where Np is a number of turns of the primary coil Np [T], Nb2 is a number of turns of the auxiliary coil Nb2 [T], and R162 and R163 are resistance values of resistors 162 and 163, respectively.

Based on formulas (2) and (3), the effective voltage value Vac_rms can be represented by the following formula (4):

$$V_{ac\_rms} = \sqrt{2} \times V_{mon\,2} \times \frac{Np}{Nb2} \times \frac{R162 + R163}{R163}. \quad (4)$$

Thus, the voltage Vmon2 is detected by an AD converter, whereby the effective voltage value Vac_rms of the commercial alternating-current power supply 101 can be estimated by formula (4). Further, measurements are made under the condition that a load current is low, or the maximum value of the voltage of the commercial alternating-current power supply 101 measured for the period of the commercial alternating-current power supply 101 is set as Vmon2, whereby the effective voltage value of the commercial alternating-current power supply 101 can be estimated with high accuracy.

If Np=30 T, Nb2=4 T, R162=100 kΩ, and R163=6.8 kΩ, the relationship between the effective voltage value of the commercial alternating-current power supply 101 and the voltage value Vmon2 is as illustrated in FIG. 4. The effective voltage range of the commercial alternating-current power supply 101 to be detected is defined as 50 Vrms to 150 Vrms. As illustrated in FIG. 4, when the effective voltage value is 150 Vrms, the voltage Vmon2 is highest, namely 1.80 V. In the present exemplary embodiment, the output voltage Vout2 is 5.1 V, and the voltage Vmon2 is less than or equal to the output voltage Vout2. Thus, the voltage value of the commercial alternating-current power supply 101 can be detected without exceeding the rated voltage of the CPU 500.

To the printer 700, the stapler unit 708 is connected as an optional device connected as an external apparatus to the printer 700. The stapler unit 708 detects that a bundle composed of a plurality of pieces of paper (hereinafter referred to as a "bundle of paper") on which images are formed is placed at a predetermined position, and performs stapling. An outline of the stapler unit 708 is described.

Figure 5:
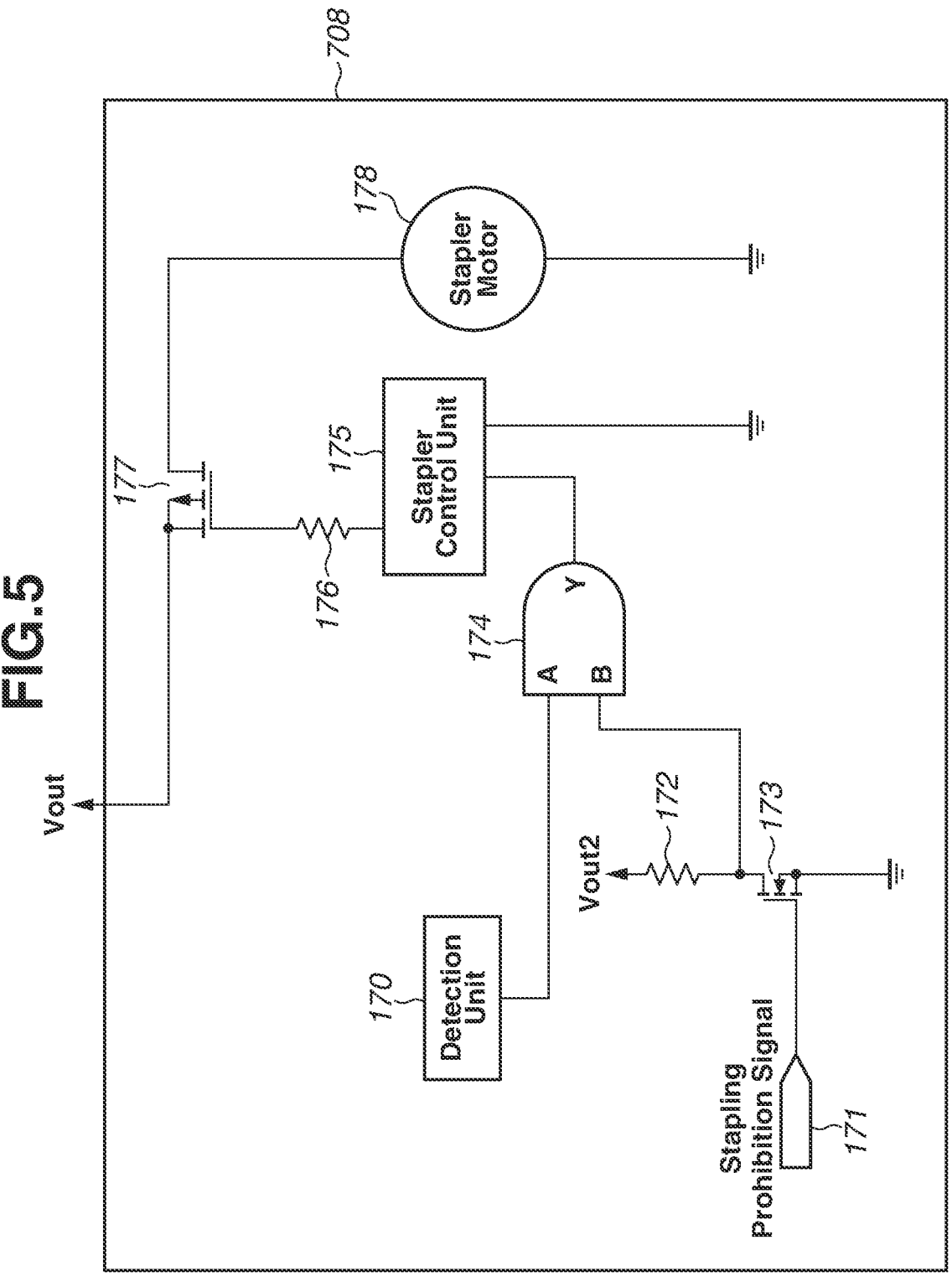
FIG. 5 is a block circuit diagram of a stapler unit.

FIG. 5 is a diagram illustrating a circuit block for controlling the stapler unit 708. A detection unit 170 includes a photointerrupter (not illustrated). When the detection unit 170 detects that a bundle of paper reaches a stapling portion, a high level signal is input to an input terminal A of an AND circuit 174. A stapling prohibition signal 171 is a signal output from the CPU 500. As will be described below, a high level signal is output to the gate of an FET 173, at the timing when stapling should be prohibited. When the stapling prohibition signal 171 is in a high level, the FET 173 is turned on. Thus, a low level signal is input to an input terminal B of the AND circuit 174. When stapling is permitted, a low level signal (a stapling permission signal) as the stapling prohibition signal 171 is output to the gate of the FET 173. Thus, the output voltage Vout2 is output as a high level signal to the input terminal B via a resistor 172.

If high level signals are input to the input terminals A and B of the AND circuit 174, the AND circuit 174 outputs a high level signal from an output terminal Y to a stapler control unit 175 as an external control unit. If a high level signal is input from the AND circuit 174 to the stapler control unit 175, the stapler control unit 175 determines that stapling can be performed. The stapler control unit 175 then turns on an FET 177 via a resistor 176. If the detection unit 170 does not detect a bundle of paper, or the stapling prohibition signal 171 is a high level signal, the AND circuit 174 outputs a low level signal and the stapler control unit 175 maintains the FET 177 in an off state. In the present exemplary embodiment, a stapler motor 178 is a DC motor. If the FET 177 is turned on, the output voltage Vout is fed to the stapler motor 178, and the stapler motor 178 rotates. If the stapler motor 178 rotates, a U-shaped staple (not illustrated) is pushed out and the staple penetrates a bundle of paper. The ends of the staple are then bent inward, whereby the bundle of paper can be bound.

The maximum value of power that can be supplied by the power supply device 100 is defined as suppliable power. A description will be given of the relationship between the voltage value of the commercial alternating-current power supply 101 and the suppliable power. Under a condition that a same power is consumed by the loads 158 and 164, in general, the lower the voltage value of the commercial alternating-current power supply 101 is, the greater the current flowing through the primary coil Np of the transformer 108 or the switching FET 107 is, and also the greater the amount of heat generation by the transformer 108 or the switching PET 107 is. The voltage specification of the commercial alternating-current power supply 101 of the power supply device 100 is often set in a predetermined range. Based on a minimum specification voltage, specifications of the coils of the transformer 108, a maximum current specification of the transformer 108, and a rating of the switching FET 107 are determined. When the maximum power is consumed by the load 158, the specifications of the transformer 108 and the switching FET 107 are determined to be within a thermal limit and a current rating. If the voltage value of the commercial alternating-current power supply 101 becomes high, the current flowing through the transformer 108 or the switching FET 107 decreases. Thus, the suppliable power can be made great. In the present exemplary embodiment, the voltage specification of the commercial alternating-current power supply 101 of the power supply device 100 is 100 Vrms to 127 Vrms. The maximum power consumption of a load (e.g., the loads 158 and 164) connected to the power supply device 100 of the printer 700 is 440 W, including a power loss generated by the DC-DC converter 165. The maximum power consumption refers to the highest power consumption in a timing chart of the power consumption of the printer 700 illustrated in FIG. 7.

Figure 6:
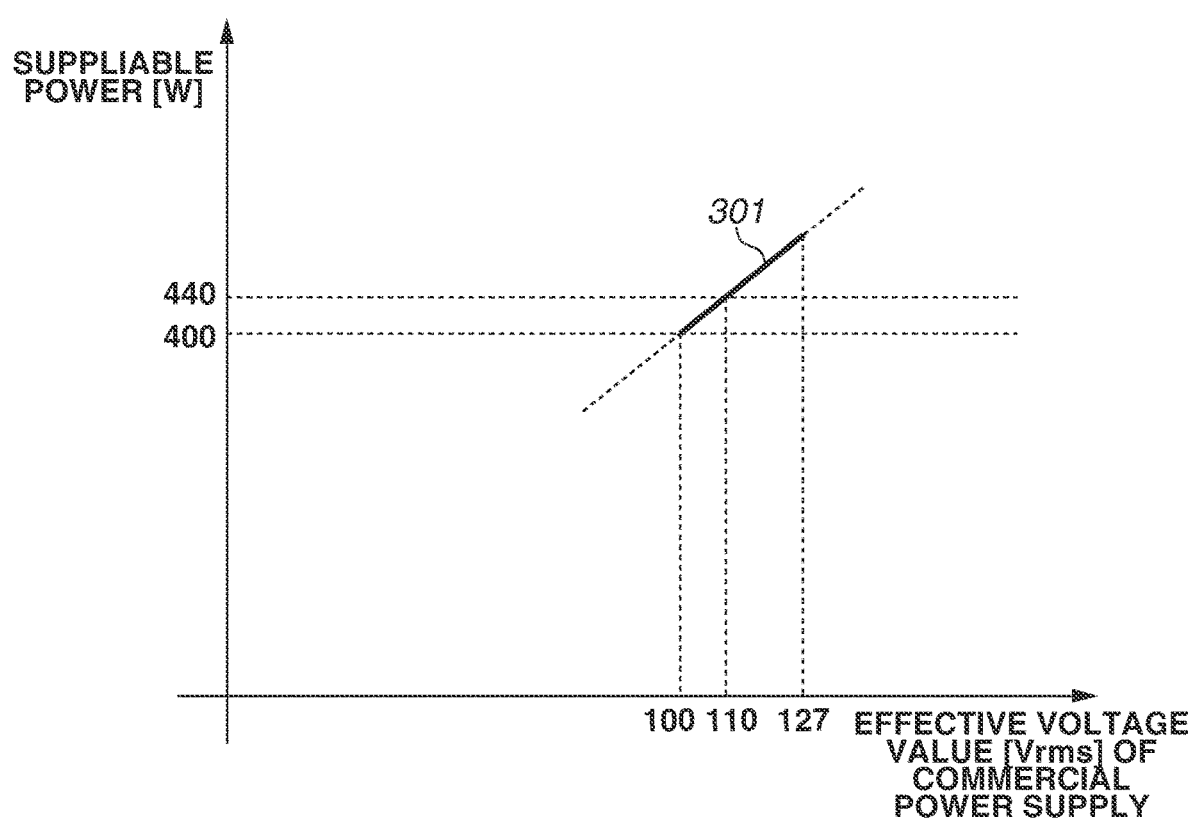
FIG. 6 is a graph diagram illustrating a relationship between a voltage value of the commercial alternating-current power supply and suppliable power of the power supply device.

FIG. 6 is an overview diagram illustrating the relationship between the voltage value of the commercial alternating-current power supply 101 and suppliable power. A solid line 301 represents the relationship between the voltage value of the commercial alternating-current power supply 101 and the suppliable power of the power supply device 100 that can output 400 W when the voltage value of the commercial alternating-current power supply 101 is 100 Vrms. When the voltage value of the commercial alternating-current power supply 101 is 110 Vrms, the suppliable power of the power supply device 100 is 440 W if approximated by the ratio of the current flowing through the power supply device 100 to the current flowing through the commercial alternating-current power supply 101. That is, even the power supply device 100 that cannot supply 440 W when the voltage value of the commercial alternating-current power supply 101 is 100 Vrms can supply a maximum power consumption of 440 W when the voltage value of the commercial alternating-current power supply 101 is 110 Vrms.

Figure 7:
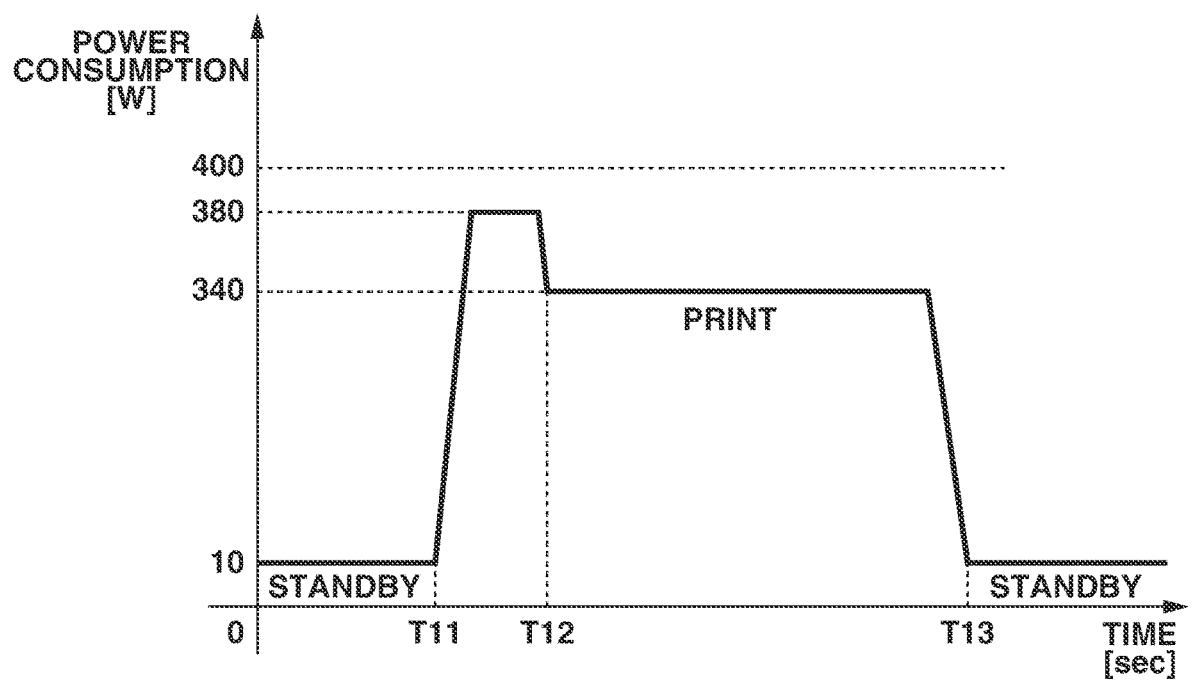
FIG. 7 is a diagram illustrating a change over time in power consumption of the power supply device.

Next, FIG. 7 illustrates a timing chart of the power consumption of the power supply device 100 in the period when printing is performed in a standby state of the printer 700, the printing ends, and the printer 700 shifts to the standby state again. In FIG. 7, the power consumption of the stapler unit 708 is not included. In the period of the standby state, the heater 117 executes preliminary heating so that printing out can be quickly performed when the user gives a print instruction. In the period of the standby state, a fan (not illustrated) for cooling the printer 700 is also driven. In the present exemplary embodiment, the power consumption consumed in the standby state is 10 W. If a print instruction is given by the user at a timing T11, the printer 700 starts rotating the motor for rotating the roller of the photosensitive drum 701 or the fixing device 706, and thereby the power consumption increases. In this period, the motor accelerates from a stationary state to the number of steady revolutions, and thus requires greater power than a power consumed when the motor rotates steadily. The motor reaches the number of steady revolutions at a timing T12, and image formation starts. In the present exemplary embodiment, a maximum value of the power consumption in the period from the timing T11 to the timing T12 is greater than a power consumption consumed after the timing T12. The maximum value of the power consumption is 380 W. In the period after the timing T12, a sheet is conveyed, an image is formed on the sheet, and the sheet is discharged to the sheet discharge tray 707. At a timing T13, the printing operation ends, the rotation of the motor stops, and the printer 700 returns to the standby state again. In the present exemplary embodiment, the maximum value of the power consumption from the timing T12 to the timing T13 is 340 W.

In the present exemplary embodiment, the power supply device 100 is can output 400 W when the voltage value of the commercial alternating-current power supply 101 is 100 Vrms. The power supply device 100 is on the premise that the power consumed by the loads 158 and 164 is a maximum of 380 W (the power consumption occurring from the timing T11 to the timing T12), and the power consumption of the stapler unit 708 is 60 W.

Between the timings T11 and T12, the power consumption of the printer 700 is a maximum of 380 W, and the suppliable power of the power supply device 100 is 400 W when the voltage value of the commercial alternating-current power supply 101 is 100 Vrms. Thus, if the power supply device 100 attempts to supply 60 W as the power of the stapler unit 708, the suppliable power of the power supply device 100 becomes 440 W (=380 W+60 W), which cannot be supplied by the power supply device 100. If, however, the voltage value of the commercial alternating-current power supply 101 is greater than or equal to 110 Vrms, the power supply device 100 can supply 440 W. In the present exemplary embodiment, a threshold for the voltage value is set to 110 Vrms.

At other timings, the power consumption is a maximum of 340 W (between the timings T12 and T13). If the power supply device 100 attempts to supply 60 W as the power of the stapler unit 708, the power of the power supply device 100 becomes 400 W (i.e., 340 W+60 W), which can be supplied by the power supply device 100 when the voltage of the commercial alternating-current power supply 101 is 100 Vrms to 127 Vrms. When printing is performed, and if the voltage value of the commercial alternating-current power supply 101 is greater than or equal to 110 Vrms, the operation of the stapler unit 708 is permitted. In contrast, if the voltage of the commercial alternating-current power supply 101 is less than 110 Vrms, the operation of the stapler unit 708 is prohibited at the timing when the power consumption exceeds the suppliable power. This control is described in detail below.

Figure 8:
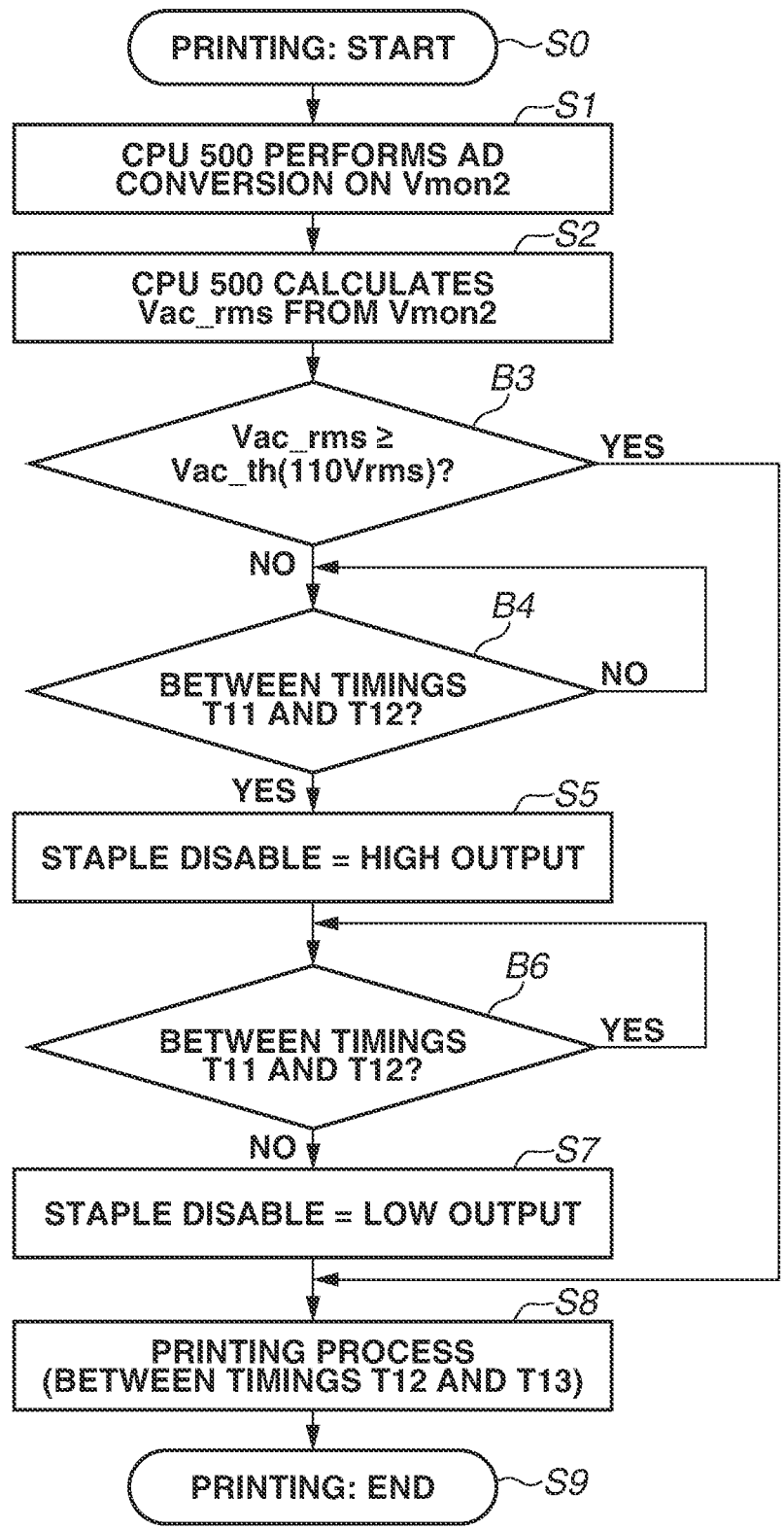
FIG. 8 is a flowchart illustrating control of the stapler unit according to the first exemplary embodiment.

FIG. 8 illustrates a flowchart when the CPU 500 detects the voltage value of the commercial alternating-current power supply 101 and controls the stapler unit 708. An initial output of the stapling prohibition signal 171 is a low level signal. In this state, a stapling operation is permitted. In step S0, the voltage Vmon2 is stable and output to the CPU 500. If printing starts in step S0, in step S1, the CPU 500 performs AD conversion on the voltage Vmon2. In step S2, the CPU 500 calculates the effective voltage value Vac_rms by formula (4), using the value of the voltage Vmon2. Consequently, the CPU 500 detects the voltage value of the commercial alternating-current power supply 101. In step B3, the CPU 500 determines whether the operation of the stapler unit 708 can be permitted based on the effective voltage value Vac_rms. A threshold Vac_th for the voltage value of the commercial alternating-current power supply 101 is used to determine whether the operation of the stapler unit 708 can be permitted. In the present exemplary embodiment, the power supply device 100 sets Vac_th=110 Vrms. If the effective voltage value Vac_rms is greater than or equal to 110 Vrms (YES in step B3), the power supply device 100 can supply power required for the operation of the stapler unit 708 at any timing. Thus, in step S8, the printing process continues. In step S9, the printing ends. If the effective voltage value Vac_rms is less than 110 Vrms (NO in step B3), the processing proceeds to step B4. In step B4, the CPU 500 waits for a timing between the timings T11 and T12. If the current timing is between the timings T11 and T12 (YES in step B4), the CPU 500 sets the stapling prohibition signal 171 to a high level signal and switches to the state where the operation of the stapler unit 708 is prohibited. In step B6, if the current timing is between the timings T11 and T12 (YES in step B6), the CPU 500 maintains the stapling prohibition signal 171 as the high level signal. If the current timing is not between the timings T11 and T12 (NO in step B6), it is not necessary to prohibit the operation of the stapler unit 708, and the processing proceeds to step S7. In step S7, the CPU 500 sets the stapling prohibition signal 171 to a low level signal. In step S8, the printing process continues. In step S9, the printing ends.

As described above, according to the present exemplary embodiment, even if the suppliable power of the power supply device 100 when the voltage value of the commercial alternating-current power supply 101 is 100 Vrms is 400 W, the power supply device 100 can supply 440 W if the voltage of the commercial alternating-current power supply 101 is greater than or equal to 110 Vrms. Thus, the power supply device 100 can always feed power to the external apparatus. This can reduce the situation where power is not supplied to the external apparatus, and therefore improve usability. The power supply device 100 can also supply power to the external apparatus without using a component having a great rated current in the power supply device 100. Thus, it is possible to reduce the cost of the power supply device 100.

In a second exemplary embodiment, a description is given of an example where a USB device as an external apparatus connected to the USB port 709 is controlled based on the voltage value of the commercial alternating-current power supply 101. Further, a description is given of a circuit configuration in which, as another example of a voltage detection unit, a voltage detection unit is provided on the primary side. Components similar to those of the first exemplary embodiment are designated by same signs, and are not described. The "USB device" refers to, for example, a memory or a hard disk that stores data. For simplicity of description, the present exemplary embodiment is described on the premise of the printer 700 that does not include the stapler unit 708 illustrated in FIG. 1.

Figure 9:
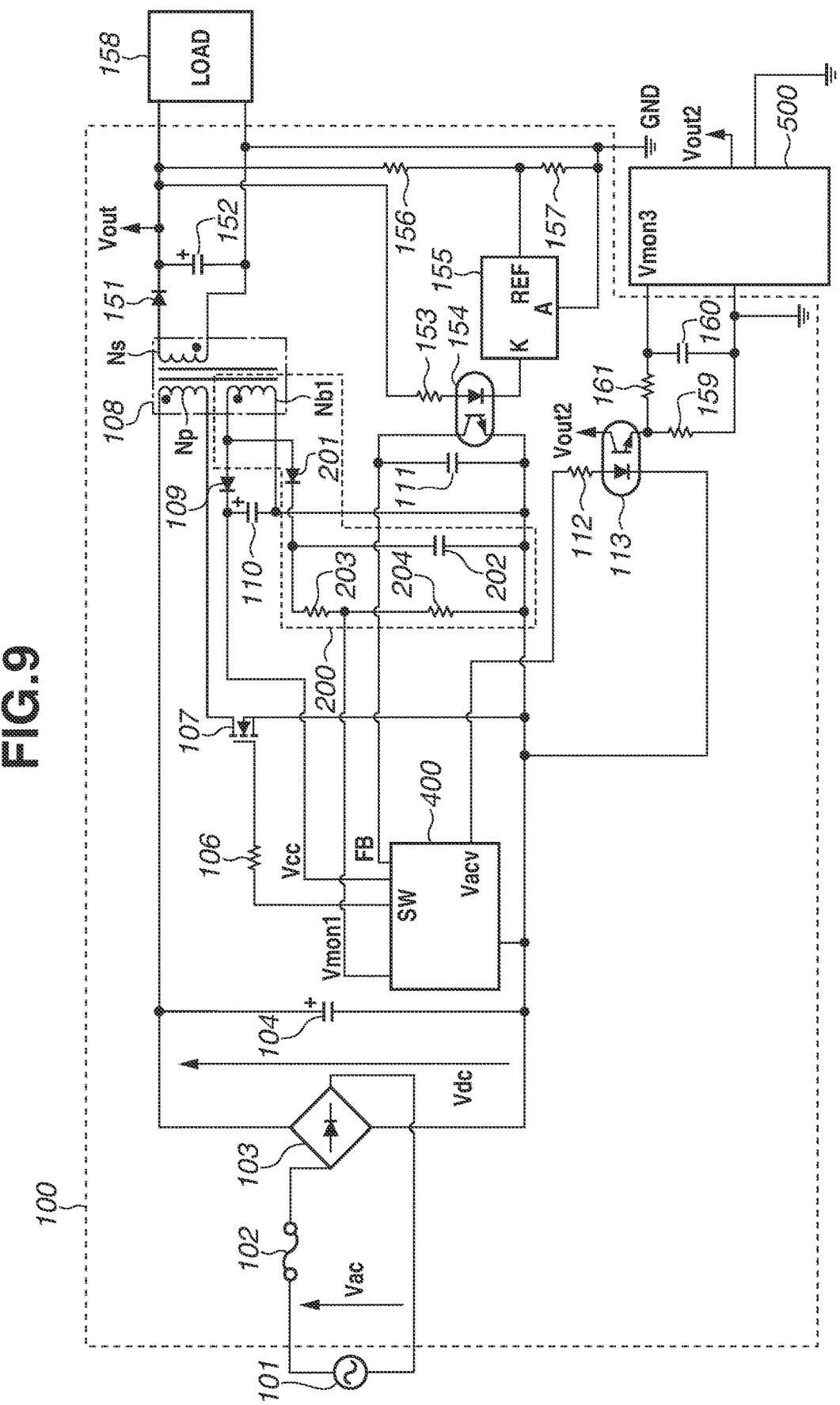
FIG. 9 is a block circuit diagram illustrating a power supply device according to a second exemplary embodiment.

FIG. 9 is a circuit diagram of the power supply device 100 according to the present exemplary embodiment. A voltage detection unit 200 is a circuit block for detecting the voltage Vdc. A voltage to be induced to the auxiliary coil Nb1 on the primary side is rectified and smoothed by a diode 201 and a capacitor 202. The resulting approximately direct current voltage is divided by resistors 203 and 204, and the divided voltage is input to a Vmon1 terminal. The power supply control IC 400 performs AD conversion on the voltage (hereinafter referred to as "Vmon1") of the Vmon1 terminal and estimates the voltage Vdc. The voltage Vmon1 can be approximately represented by the following formula (5):

$$V_{mon1} = V_{dc} \times \frac{Nb1}{Np} \times \frac{R204}{R203 + R204}, \quad (5)$$

where R203 and R204 are resistance values of the resistors 203 and 204, respectively, and Nb1 is a number of turns of the auxiliary coil Nb1 on the primary side.

Similarly to formula (4), the effective voltage value Vac_rms can be represented by the following formula (6):

$$V_{ac\_rms} = \sqrt{2} \times V_{mon1} \times \frac{Np}{Nb1} \times \frac{R203 + R204}{R204}. \quad (6)$$

Figure 10:
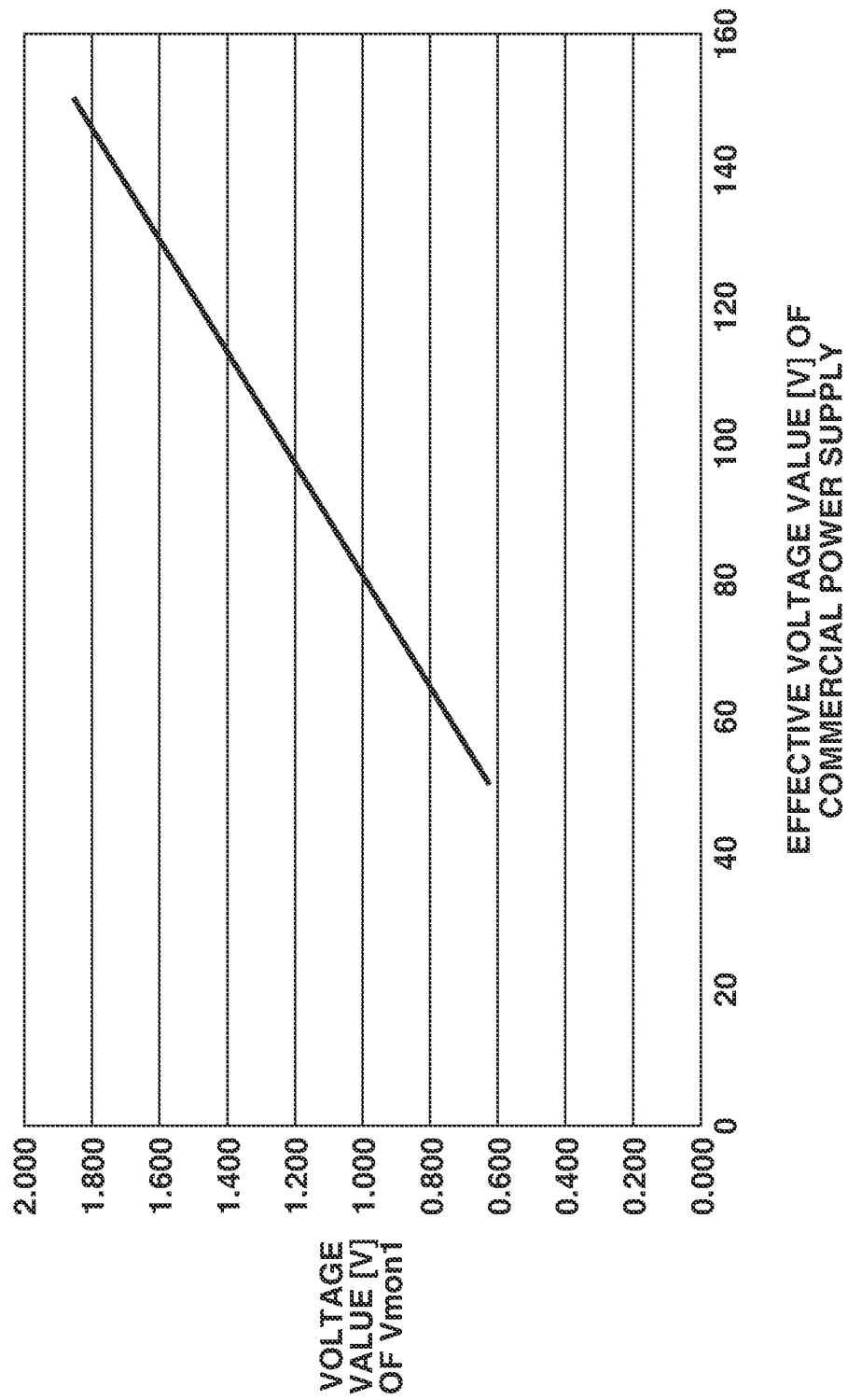
FIG. 10 is a graph diagram illustrating a relationship between an effective voltage value of a commercial alternating-current power supply and a voltage value of a capacitor connected to an auxiliary coil on a secondary side of a transformer according to the second exemplary embodiment.

The voltage range of the AD conversion of the power supply control IC 400 is 0 V to 3.3 V, Np=30 T, Nb1=6 T, R203=100 kΩ, and R204=5.6 kΩ. Under such a condition, a relationship between the effective voltage value of the commercial alternating-current power supply 101 and the voltage value of the voltage Vmon1 is as illustrated in FIG. 10. The effective voltage range of the commercial alternating-current power supply 101 to be detected is defined as 50 Vrms to 150 Vrms. As illustrated in FIG. 10, the voltage Vmon1 is highest (1.875 V) when the effective voltage value is 150 Vrms. The power supply control IC 400 can calculate the effective voltage value Vac_rms by formula (6), using a value obtained by performing AD conversion on the voltage Vmon1.

A description is given of a configuration in which the voltage detection result is transmitted to the CPU 500. The power supply control IC 400 outputs the calculated voltage detection result of the commercial alternating-current power supply 101 as a pulse-width modulation (PWM) signal from a Vacv terminal. If a high level signal (3.3 V in this case) is output from the Vacv terminal, a current flows through a photodiode of a photocoupler 113 via a resistor 112. On the secondary side, a phototransistor of the photocoupler 113 is turned on, and a capacitor 160 is charged with the output voltage Vout2 via a resistor 161. If, in contrast, a low level signal (0.1 V in this case) is output, the photodiode of the photocoupler 113 shifts to a non-conducting state. Power is consumed via the resistor 161 and a resistor 159. Thus, the capacitor 160 is repeatedly charged and discharged, and the voltage of a Vmon3 terminal becomes stable at a voltage value according to the duty of the PWM signal. The CPU 500 performs AD conversion on the voltage Vmon3 and reads the voltage Vmon3 as voltage information. The longer the on duty of the Vacv terminal is, the longer the charging time of the Vmon3 terminal is. Thus, the voltage Vmon3 becomes high.

For example, the voltage Vmon3 becomes stable in about 50 msec if a simulation is performed under the following conditions: the resistor 112 is 150Ω, the resistor 159 is 470Ω, the resistor 161 is 10 kΩ, the capacitor 160 is 1 uF, and the frequency of the Vacv terminal is 10 kHz. If the on duty of the Vacv terminal to be used is 20% to 80%, the voltage Vmon3 is 1.46 V to 4.40 V. The range of the voltage Vac that should be detected may be set to Vac_rms=50 to 150 V. Then, if the voltage Vmon3 is 1.46 V, the CPU 500 may be programmed to recognize that Vac_rms=50 V. If the voltage Vmon3 is 4.40 V, the CPU 500 may be programmed to recognize that Vac_rms=150 V. If the voltage Vmon3 is between 1.46 V and 4.40 V, the effective voltage value Vac_rms may be linearly interpolated. An approximation formula obtained by the simulation is represented by formula (7):

$$V_{ac\_rms} = \frac{V_{mon\,3} + 0.101}{0.0294}. \tag{7}$$

A description is given of control of the USB device connected to the USB port 709 according to the voltage value of the commercial alternating-current power supply 101. The suppliable power of the power supply device 100 (FIG. 6), the voltage range of the commercial alternating-current power supply 101 (100 Vrms to 127 Vrms), and a timing chart (FIG. 7) of the power consumption in a standby state and printing are similar to those in the first exemplary embodiment. The maximum power consumption of the USB device connected to the USB port 709 is 60 W.

Figure 11:
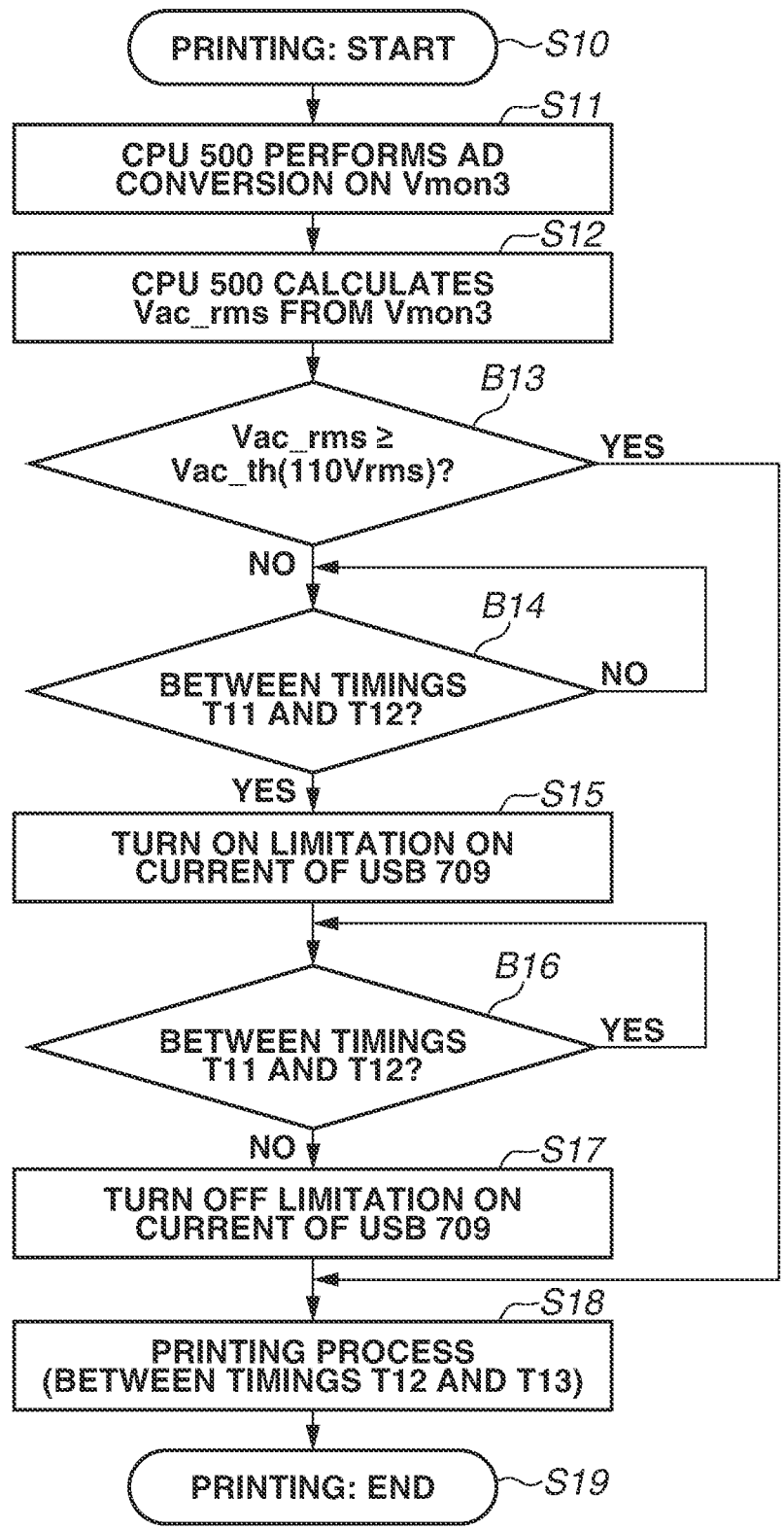
FIG. 11 is a flowchart illustrating control of a Universal Serial Bus (USB) port according to the second exemplary embodiment.

FIG. 11 illustrates a flowchart when the CPU 500 detects the voltage value of the commercial alternating-current power supply 101 and controls the USB port 709. If printing starts in step S10, then in step S11, the CPU 500 performs AD conversion on the voltage Vmon3. In step S12, the CPU 500 calculates the effective voltage value Vac_rms by formula (7) based on the voltage Vmon3. In step B13, if the effective voltage value Vac_rms is greater than or equal to the threshold Vac_th (YES in step B13), it is not necessary to limit the power consumption of the USB device connected to the USB port 709. Thus, in step S18, the printing process continues. In step S19, the printing ends. If the effective voltage value Vac_rms is less than the threshold Vac_th (NO in step B13), the processing proceeds to B14. In step B14, the CPU 500 waits for a timing between the timings T11 and T12. If the current timing is between the timings T11 and T12 (YES in step B14), the processing proceeds to S15. In step S15, the CPU 500 turns on the limitation on the current of the USB port 709. Specific methods for turning on the limitation on the current of the USB port 709 will be described below. In step B16, the CPU 500 maintains the limitation on the current of the USB port 709, if the current timing is between the timings T11 and T12 (YES in step B16). In step B16, if the current timing is not between the timings T11 and T12 (NO in step B16), it is not necessary to limit the current of the USB port 709. Thus, in step S17, the CPU 500 turns off the limitation on the current of the USB port 709. In step S18, the printing process continues. In step S19, the printing ends.

A description is given of the methods for limiting the current of the USB port 709 described in step S15 illustrated in FIG. 11. Between the timings T11 and T12, the power consumption of the printer 700 is 380 W, and the maximum power consumption of the USB device connected to the USB port 709 is 60 W. Thus, the total power consumption is 440 W. The suppliable power of the power supply device 100 is 400 W when the voltage value of the commercial alternating-current power supply 101 is less than 110 Vrms. Thus, power is insufficient by 40 W (i.e., 440 W−400 W). Thus, it is necessary to set power that can be used by the USB port 709 to 20 W (i.e., 60 W−40 W). The description will be given using as an example a configuration in which a plurality of USB ports 709 and four USB ports are included at this time. The maximum power consumption per port is 15 W.

As a first method, the power usage per port is limited to 5 W using a current limitation IC. The total power usage of the four ports is 20 W, accordingly. Thus, the power consumption of the printer 700 between the timings T11 and T12 is 400 W (i.e., 380 W+20 W). Thus, the power supply device 100 can supply 400 W.

As a second method, the communication speeds of the USB device connected to the USB port 709 and the CPU 500 are lowered. If the communication speeds are lowered, the power consumption of the USB device is lower than normal. Thus, the power consumption of the USB device only needs to be 20 W or less.

As a third method, available USB ports 709 are reduced. For example, three of the four ports are made unavailable, whereby the power consumption can be reduced to 15 W. Specifically, there is a method for detecting whether the USB device is connected to each of the USB ports 709, and permitting the supply of power to only one of the ports to which the USB device is connected first.

These methods are merely examples. Alternatively, another method for reducing the power consumption may be used, or the first to third methods may be combined together. Although the description has been given of the configuration in which four USB ports are included, the above methods can also be applied to a configuration in which only a single USB port is included.

As described above, according to the present exemplary embodiment, the power consumption of the USB device connected to the USB port 709 is controlled according to the voltage value of the commercial alternating-current power supply 101, whereby it is possible to reduce the cost related to the power supply device 100 without impairing the usability of the USB device.

The method for limiting the power supply can be provided also in the configuration of the power supply device described in the first exemplary embodiment, as the configuration in which the USB device can be connected according to the present exemplary embodiment.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-185607, filed Oct. 9, 2019, which is hereby incorporated by reference herein in its entirety.

What is claimed is:

1. An image forming apparatus to which an external apparatus is connected, the image forming apparatus comprising:
an image forming member configured to form an image; and
a power supply device configured to supply power to the image forming apparatus and the external apparatus,
wherein the power supply device comprises
a transformer configured to convert an alternating current voltage supplied from a commercial alternating-current power supply to a primary side into a voltage to be output to a secondary side, and the transformer including a primary coil on the primary side, a secondary coil on the secondary side, and an auxiliary coil, and
a voltage detection circuit configured to detect voltage information regarding the alternating current voltage input to the power supply device based on a voltage of the auxiliary coil,
wherein the external apparatus further comprises a switch configured to be turned on to supply power from the secondary side of the transformer of the power supply device to the external apparatus and to be turned off to stop the supply of the power from the secondary side of the transformer of the power supply device to the external apparatus,
wherein the image forming apparatus further comprises a processor configured to obtain an effective voltage value of the commercial alternating-current power supply based on the voltage information detected by the voltage detection circuit;
wherein power to be supplied by the power supply device in a case where the effective voltage value is a first voltage is larger than power to be supplied by the power supply device in a case where the effective voltage value is a second voltage lower than the first voltage, and
wherein, in a case where the effective voltage value is the first voltage, the switch is turned on so as to supply power from the secondary side of the transformer to the external apparatus, and in a case where the effective voltage value is the second voltage, the switch is turned off so as to stop power from the secondary side of the transformer to the external apparatus.

2. The image forming apparatus according to claim 1, wherein the processor is further configured to control the image forming apparatus,
wherein, in a period when power consumption of the image forming member is highest, the processor outputs to the external apparatus a signal prohibiting an operation of the external apparatus, whereby the switch stops the supply of power to the external apparatus.

3. The image forming apparatus according to claim 1,
wherein the power supply device further includes a control circuit configured to control an operation of the power supply device,
wherein the power supply device includes a transformer configured to convert the alternating current voltage input to a primary side into a voltage to be output to a secondary side,
wherein the voltage detection circuit detects, from the voltage of the auxiliary coil on the secondary side, a voltage value of a voltage input from the commercial alternating-current power supply, and wherein the image forming apparatus further comprises a transmission circuit configured to transmit the voltage information detected by the voltage detection circuit to the control circuit.

4. The image forming apparatus according to claim 1,
wherein the power supply device further includes a control circuit configured to control an operation of the power supply device, and
wherein output voltage information regarding a voltage output from the secondary coil of the transformer is transmitted to the control circuit.

5. The image forming apparatus according to claim 1, further comprising a Universal Serial Bus (USB) device configured to make a USB connection; and
a port to which the USB device is connected,
wherein, in a state that the switch is turned on, in a case where the effective voltage value is the first voltage, a power supplied to the USB device from the secondary side of the transformer of the power supply device is first power and in a case where the effective voltage value is the second voltage, power supplied to the USB device from the secondary side of the transformer of the power supply device is second power smaller than the first power.

6. An image forming apparatus to which an external apparatus is connected, the image forming apparatus comprising:
an image forming member configured to form an image;
a processor configured to control the image forming apparatus; and
a power supply device configured to supply power to the image forming apparatus and the external apparatus,
wherein the power supply device comprises
a transformer configured to convert an alternating current voltage supplied from a commercial alternating-current power supply to a primary side into a voltage to be output to a secondary side, the transformer including a primary coil on the primary side, a secondary coil on the secondary side, and an auxiliary coil, and
a voltage detection circuit configured to detect voltage information regarding an alternating current voltage input to the power supply device based on a voltage of the auxiliary coil,
wherein the external apparatus further comprises a switch configured to be turned on to supply power from the secondary side of the transformer of the power supply device to the external apparatus and to be turned off to stop the supply of power from the secondary side of the transformer of the power supply device to the external apparatus,
wherein the processor is further configured to obtain an effective voltage value of the commercial alternating-current power supply based on the voltage information detected by the voltage detection circuit;
wherein power to be supplied by the power supply device in a case where the effective voltage value is a first voltage is larger than power to be supplied by the power supply device in a case where the effective voltage value is a second voltage lower than the first voltage,
wherein, in a case where the effective voltage value is the first voltage, the switch is turned on so as to supply power from the power supply device to the external apparatus, and in a case where the effective voltage value is the second voltage, the switch is turned off so as to stop power from the power supply device to the external apparatus, wherein the external apparatus includes an external processor configured to control an operation of the external apparatus, and wherein, in a case where the effective voltage value the first voltage, the processor outputs a permission signal permitting the operation of the external apparatus to the external processor, thereby turning on the switch, and in a case where the effective voltage value is the second voltage, the processor outputs a prohibition signal prohibiting the operation of the external apparatus to the external processor, thereby turning off the switch.

7. The image forming apparatus according to claim 6, wherein the external apparatus is a stapler configured to staple a plurality of sheets on which images are formed by the image forming apparatus.

* * * * *